Figure 1:
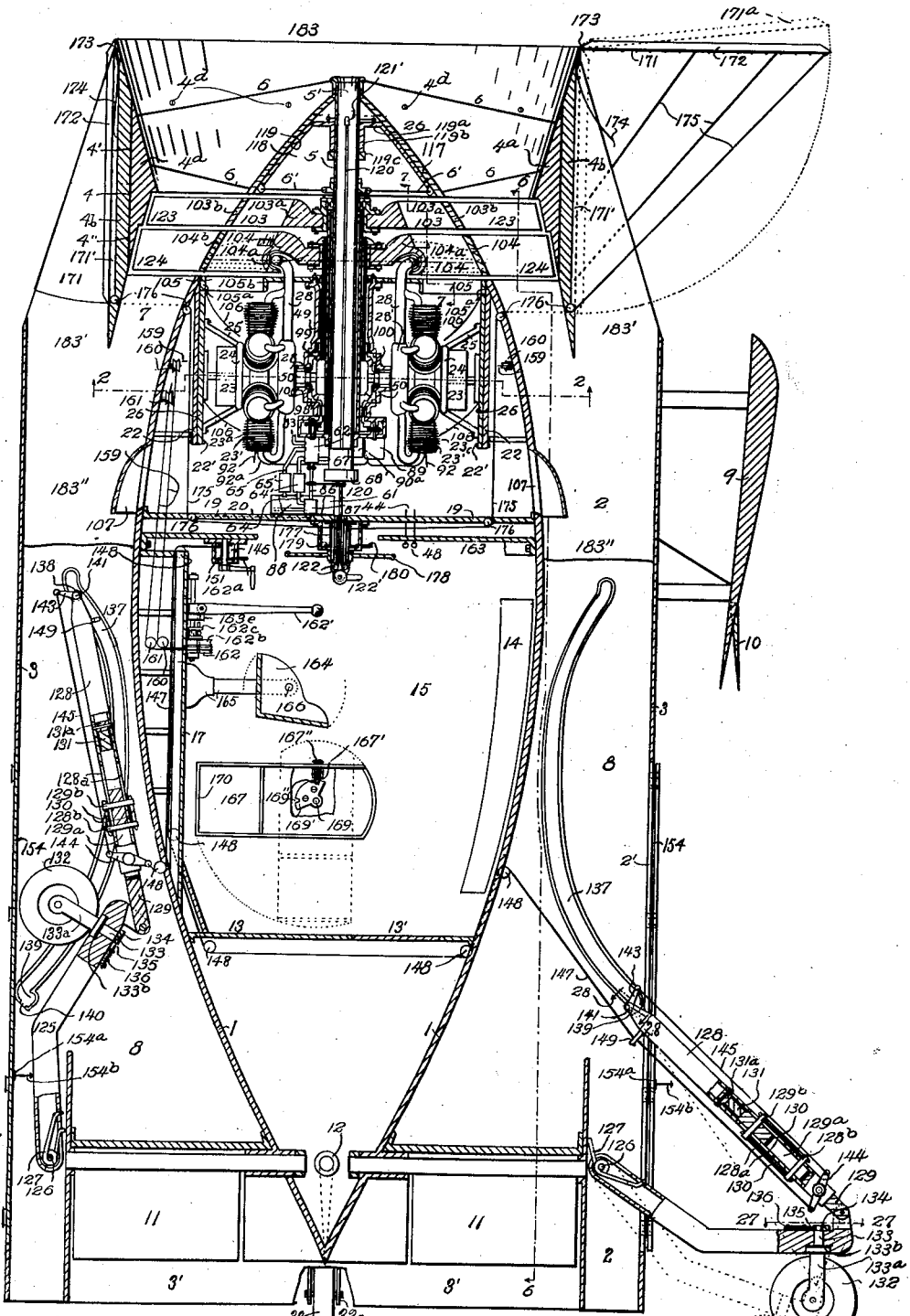

March 19, 1940.　　D. E. VAN VACTOR　　2,194,060
AIRCRAFT
Filed Aug. 13, 1934　　4 Sheets-Sheet 1

Inventor
David E. VanVactor

March 19, 1940.　　D. E. VAN VACTOR　　2,194,060
AIRCRAFT
Filed Aug. 13, 1934　　4 Sheets-Sheet 2
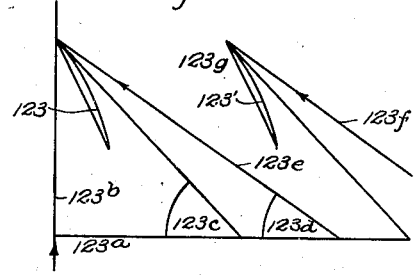
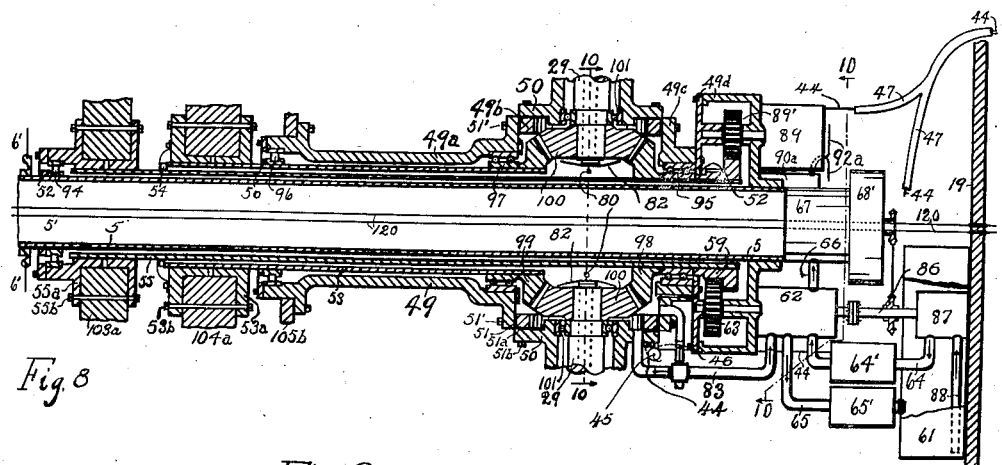
Inventor
David E. Van Vactor

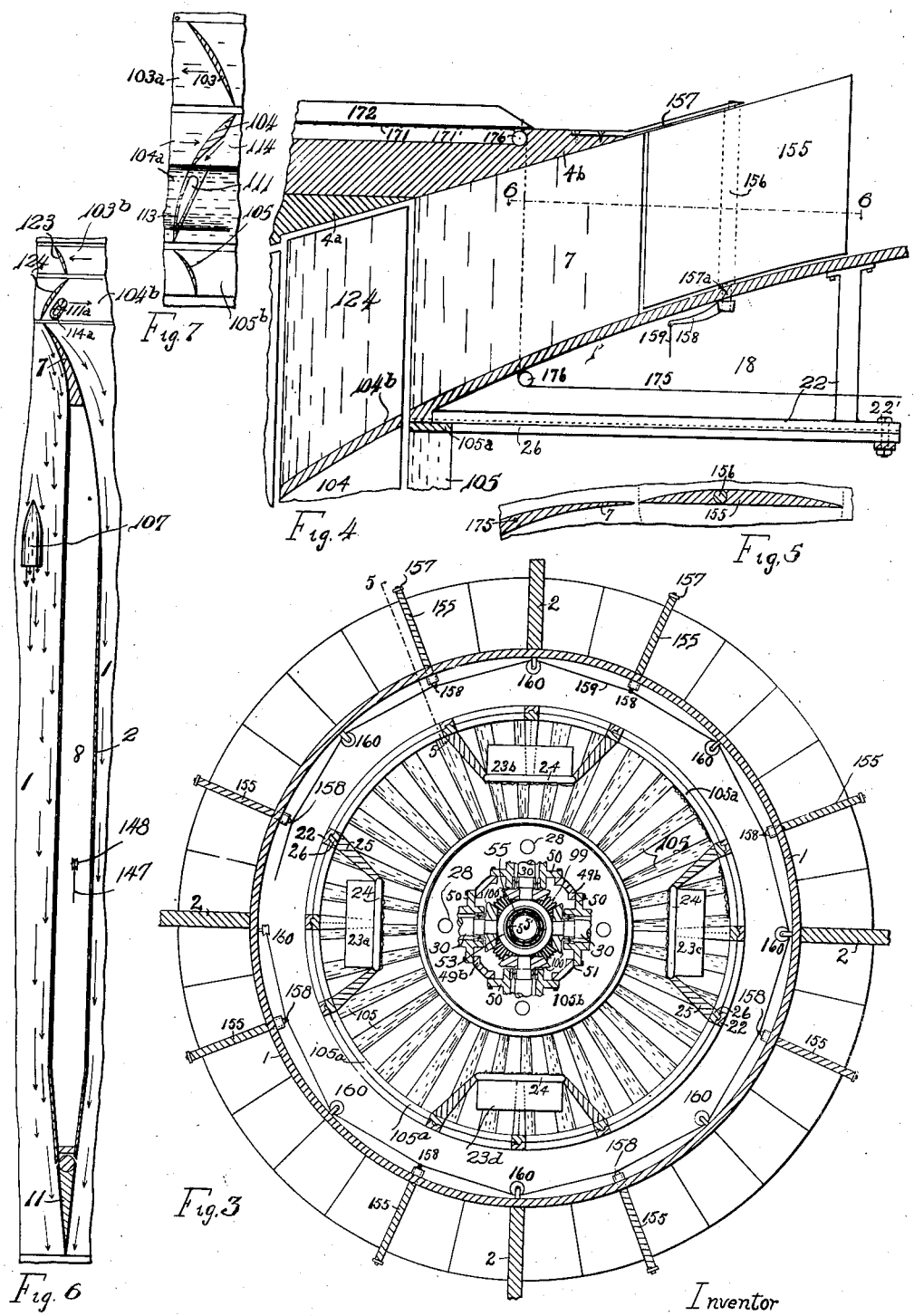

March 19, 1940. D. E. VAN VACTOR 2,194,060
AIRCRAFT
Filed Aug. 13, 1934 4 Sheets—Sheet 4
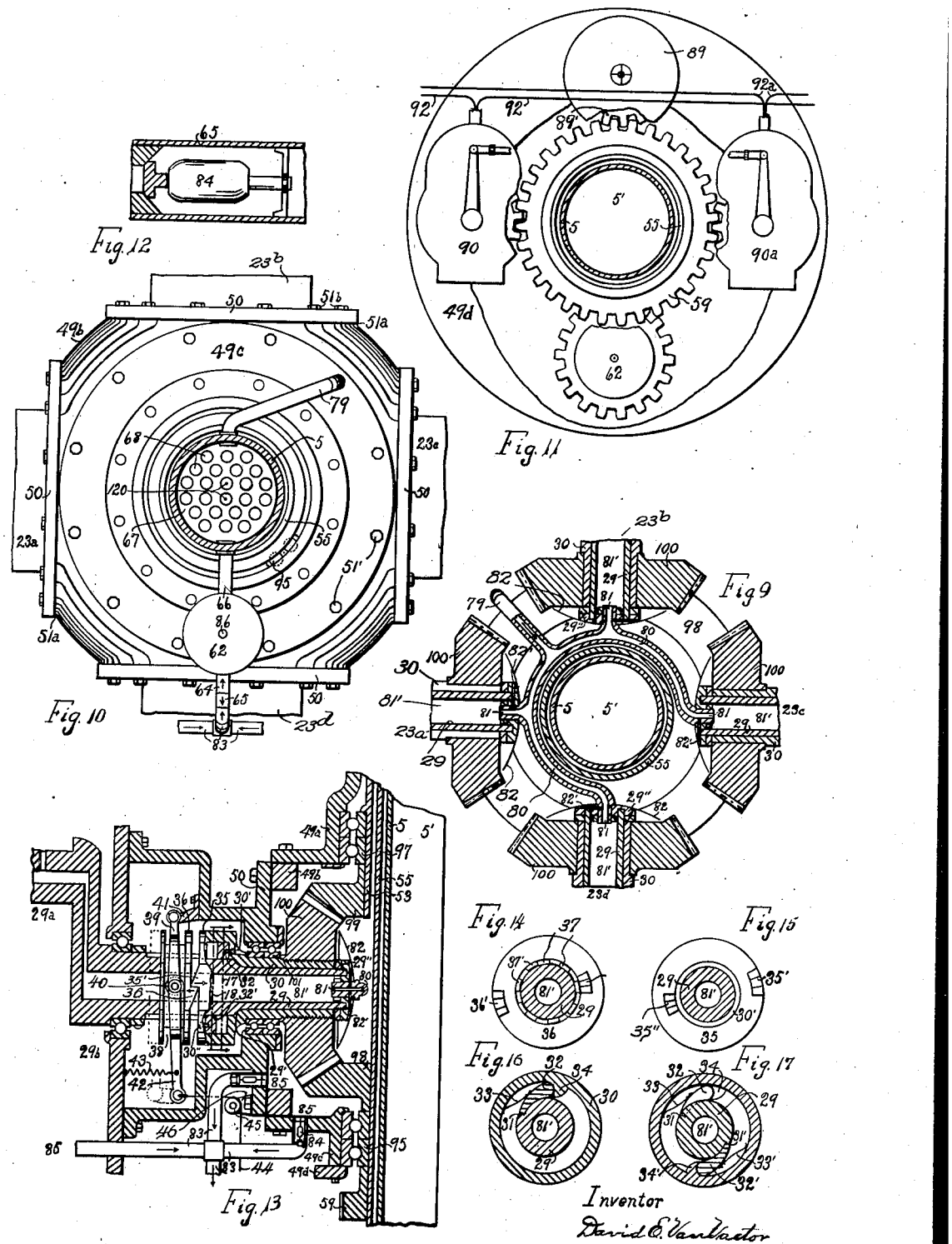
Inventor
David E. Van Vactor Patented Mar. 19, 1940

2,194,060

UNITED STATES PATENT OFFICE 2,194,060

AIRCRAFT

David E. Van Vactor, Evanston, Ill.; David Van Vactor administrator of said David E. Van Vactor, deceased Application August 13, 1934, Serial No. 739,540

5 Claims. (Cl. 244—65)

This invention relates to aircraft designed to ascend and land vertically as well as horizontally.

The objects of this invention are: First, to provide an aircraft composed of two co-ordinate unitary structures designed to be removably joined together to form the craft as a whole. These co-ordinate structures consist of a general framework including the necessary subordinate elements belonging thereto, and a complementary framework containing a power and impeller-propeller assembly incorporated therein. This construction cheapens manufacture and facilitates the separation of the unitary structures, to render the power and impeller-propeller assembly accessible for inspection, repair and replacement. Such structure is embodied in a craft designed to ascend and land vertically, with resilient, retractable landing gear installed in the general framework and extensible laterally therefrom to furnish a wide base to stabilize the craft when landed in an upright attitude, and having means of conveyance in co-operation with the impeller-propeller and control means for necessary limited travel upon the ground; Second, to provide novel co-operative means in a power and impeller-propeller assembly for a group of engines geared in unison through a transmission train to a compound impeller-propeller with blades shaped and set to lessen noise, effectively use power to propel the craft, to co-operate in lowering the craft, to cool the engines, and to muffle their exhaust; Third, to provide a co-operative accessory assemblage in the power and impeller-propeller assembly to supply its needs that are common to its various parts.

These objects and minor related ones are attained by the preferred mechanism and means illustrated in the accompanying drawings, described in the specifications and pointed out in the claims.

In the drawings Fig. 1 is a view principally in vertical section showing a landing sail extended upon the right to illustrate its position for landing, and collapsed upon the left to illustrate its position during flight. This view shows a landing wheel on the right extended to the position of all the landing wheels in landing and transporting the craft while landed, and a landing wheel retracted on the left to show the position of all the landing wheels during flight. It also shows two radial engines of a group in elevation with the valve operating elements removed, on the line 1—1, Fig. 2. Fig. 2 shows the framework of the power and impeller-propeller assembly removed from the craft with the engines represented by the crank lines and the transmission mechanism removed, on the same line as Fig. 1; Fig. 3 is a cross section on the line 3—3 of Fig. 1, with the engine bodies cut away; Fig. 4 is a section and elevation on the line 4—4 of Fig. 3; Fig. 5 is a section on the line 5—5 of Fig. 4; Fig. 6 is a section on the line 6—6 of Fig. 1; Fig. 7 is a section on the line 7—7 of Fig. 1; Fig. 8 is an enlarged fragmental detail on the same line as Fig. 1; Fig. 9 is a section on the line 9—9 of Fig. 8; Fig. 10 is principally in elevation with the accessory case and accessories removed except the oil pump on the line 10—10 of Fig. 8; Fig. 11 is principally in elevation with the accessory case cut away showing the accessory drive and the location of accessories, on the same line as Fig. 10; Fig. 12 shows check valves in the scavenger oil lines; Fig. 13 is a fragmental section showing oil sumps and clutches for starting the engines on the same line as Fig. 8; Fig. 14 shows the face of the movable clutch jaw looking with the arrow on its periphery in Fig. 13; Fig. 15 shows the face of the clutch jaw counter to the clutch jaw in Fig. 14; Fig. 16 shows one half of a one way clutch on the line 16 of Fig. 13; Fig. 17 shows the other half of the one way clutch on the line 17 of Fig. 13; Fig. 18 is a diagram showing shape and pitch of a propeller blade; Figs. 19 and 20 are diagrams showing propeller blade slant; Fig. 21 is a diagram showing six engines.

In the drawings Fig. 1 represents the principal parts of the aircraft. The fuselage 1, is the main body, and the standards 2, support it when at rest, clear of the ground. Each of the standards 2, is joined along its inner edge to the fuselage 1, merged into a helical blade 7, Fig. 7, and extends forward over the outside of the encasement 4. Each is hollow with its sides converging at the rear next to the fuselage for the attachment of the rudders 11, and elevators 12, Figs. 1 and 7, and the outer portion continues beyond the rear end of the fuselage. The incircling shell 3, is attached to the outer edge of each standard. It is preferably flexible in its rear portion 3', shown at the bottom of Fig. 1, as extending to the ground when the landing wheels are housed ready for ascension.

Each standard 2, has a landing wheel arm 125, and an extension brace 128, hinged thereto at its outer end. An opening 2', opens into the recess 8, in each of the standards 2, Fig. 1. The arm 125, is hinged to the standard at 126, inside the recess 8, and is provided with a spring 127, to extend it when released for landing. The inner end of the brace 128, has an axle 141, with each end of the axle equipped with a carrier wheel, operating in the races 137, one of which is attached on each side the recess 8, in each of the standards 2, Fig. 1. Each race 137, has a pocket 139, Fig. 1, formed at its lower end into which a carrier wheel passes which locks it from retraction. The axle 141, has a lever 143, affixed to it with an operating link 145, connecting it to the upper horn of the rocker arm 144. A cable 147, is attached to the lower horn of the rocker arm 144, and passes over the guard 149, and guide pulleys 148, to an operating winch 146, near the pilot's seat 164. The left side of Fig. 1, illustrates the position of all of the landing wheels 132, during flight. When a landing is to be made the winch 146, is released by disengaging the pawl 152, from the ratchet 151, and the springs 127, throw the landing arms 125, against the automatic latch trips 154b, and the doors 154, are forced open and the arms 125, and landing wheels 132, are extended by the springs 127, aided by gravity, to a position as shown in dotted lines at the right side of Fig. 1.

The hollow extension brace 128 is so constructed that when the extended wheels 132 come into contact with a landing base, the weight of the craft forces the landing equipment into the position shown in solid lines at the right of Fig. 1, cushioning the landing contact, and supporting the craft at a predetermined distance above the surface of the landing base. The craft can be turned in any direction and transported upon the landing caster wheels 132 by running the propeller and operating the rudders 155, and the elevators 12, and rudders 11. Each landing wheel 132 is mounted between the prongs 133a, of the supporting standard 133, which swivels upon the bearing 133b, in the arm 125. A returning cam 134 is affixed to the top of the standard 133 with a cam wheel 135 pressed against it by the thrust plunger and spring 136, Fig. 1.

Each cam 134, is so placed as to cooperate with gravity in aligning the wheels 132, with the arms 125, during the retracting process. This process is accomplished before ascension by winding in the cables 147, upon the winch 146. This operates the rocker arms 144, and through the links 145, and the levers 143, turns the axles 141, and lifts the carrier wheels out of the pockets 139, and holds them out while by continued winding of the winch 146, each landing wheel and its equipment is housed in its allotted recess 8, in the standards 2. The doors 154, are then closed and held shut by spring latches 154a, arranged to open automatically by the pressure of the arms 125, against the latch trips 154b, to release the wheels and their equipments for landing.

The cylindrical encasement 4 is composed, in reference to its inside longitudinal contour, of a converging front portion 4', and a diverging rear portion 4". It is, also, divided circumferentially into an inside annular section 4a, and outside annular section 4b, Figs. 1, 2, and 4. This last division is made to permit the craft as a whole to be manufactured in two unitary structures. The outside annular section 4b is affixed to the standards 2, and to the outside ends of the helical blades 7. It forms a barrel with an inside diameter to fit and attach the inside annular section 4a. The section 4a, surrounds the propeller blades 123 and 124, which belong to the power and impeller-propeller assembly in the complementary framework.

The standards 2 extend the full length of the craft. They have recesses 8 formed in them for the installation of the landing wheels 132, and the equipment for extending and retracting them, Fig. 1. The standards 2, with the wheels 132, extended, furnish, in co-operation with the lift of the power and impeller-propeller assembly, support and conveyance for the craft when landed, Fig. 1. The encircling shell 3 is attached to the outside edge of the standards 2, Fig. 1. The fuselage 1 is streamlined and affixed to the standards 2 and the helical blades 7. It has a bulkhead 19, with doors 20, partitioning off an engine room 18. Between this and a rear bulkhead 13 is formed an operating room 15, Fig. 1. A series of engine anchorage frames 22 is erected in the engine room 18, and designed to be removably joined to the ribs 26 in the complementary framework.

The preferred section of the fuselage 1 is circular. The front wall of the engine room 18 is not included in the general framework which is thus left open to receive the complementary framework with the power and impeller-propeller assembly incorporated therein, to complete the craft as a whole. Thus constructed the general framework is very substantial and gives ample opportunity for the attachment of aerofoils 9, with ailerons 19, and a landing sail 171 affixed high above the center of weight when the craft is descending vertically. The load carrying room 15 provides for seating and for the erection of operating means to control the landing sail 171, the empennage rudders 11 and 12, the roll rudders 155, and the usual equipment and instrumentalities for practical aerial transportation including an instrument board 163 and navigation instruments indicated thereon.

The complementary framework comprises an installation frame, for each engine 23, consisting of a mounting ring 24, braces 25, and ribs 26, Figs. 1, 2 and 3. The ribs 26 are formed to fit the anchorage frames 22, and be removably attached thereto. The ribs 26 are affixed at their front ends to a band 105a, which is formed to fit into the open end of the fuselage 1, Figs. 1 and 4. The band 105a is affixed to the outer ends of a series of stationary impeller blades 105. These blades 105 form the major part of the front wall of the engine room 18, and are affixed at their inner ends to an annular central plate 105b, Fig. 3. A transmission case 49, as a whole, is composed of sections 49a, 49b, 49c, and 49d, Figs. 2 and 8. These sections are adjustably joined and held together by bolts 51', Figs. 1 and 10.

The section 49a is fitted and affixed to the central plate 105b, and carries the bearing 96, Fig. 8. The section 49b has an opening with an attachment seat formed around it for each engine 23. Each engine body has a flange 50 formed at its driver end to fit the attachment seat to which it is adjusted by shims 51a, and held by bolts 51b, Figs. 8 and 10. Each engine body is attached at its outer end to the mounting ring 24, which is adjustably affixed to the ribs 26, by the braces 25, Figs. 1, 2 and 3. The section 49c is affixed to the section 49b, and carries the bearing 97, Figs. 8 and 10. The section 49d, composed of the plate 57, and a rear plate and rim 58, is affixed to the section 49c, and to a stationary shaft 5, Figs. 1, 2 and 8. This section contains an accessory drive gear 59, and lay gears and shafts to drive necessary accessories to the power and impeller-propeller assembly. The shaft 5 extends centrally through the case 49, and forward beyond it. A streamlined cone 117 is affixed at its apex to the shaft 5, and bound thereto at its base by the guys 6'. The cone 117 and the shaft 5 are bound and held in place by the guys 6, attached thereto and to the inner annular section 4a of the encasement 4.

The power and impeller-propeller assembly comprises a group of engines geared through a common transmission train to two compound impeller-propeller members designed to rotate reversely in adjacent planes. The impeller element of the two rotary members is made up of the helical blades 103, surrounded by the streamlined rim 103b, in the front member, and the helical blades 104, surrounded by the streamlined rim 104b, in the rear member, located immediately in front of the stationary helical blades 105. The propeller element of the two rotary members is made up of the helical blades 123, attached to the rim 103b, in the front member, and the helical blades 124, attached to the rim 104b, in the rear member, located immediately in front of the stationary helical blades 7. It is to be noted that the stationary blades 7 are co-operative with the propeller system and a part of the general framework; and that the stationary blades 105, the cone 117, the hollow shaft 5, the bodies of the engines 23, and the transmission case 49, all serve double purposes by being a part of the power and impeller-propeller assembly and, also, incorporated within the complementary framework and a part of it.

Other details of the organization and co-operation of the power and impeller-propeller assembly are given in the following order: The power transmission train; the accessory assemblage; the impeller intake; the impeller-propeller; the function of the impeller and minor cooling auxiliaries; an exhaust muffler; shape, pitch and slant of the propeller blades; a lubrication system; a starting system; and ignition from a common source for the group of engines.

A tubular shaft 55, with a hub 55a, is journaled by a bearing 94, to the shaft 5, and by a bearing 95, to the case 49. A tubular shaft 53, is journaled to the case 49, by bearings 96, and 97. The bearings 95, and 97, are preloaded to insure accuracy in gear mesh and to take the thrust of the shafts 55, and 53. The bearings 94, and 96, are of a type to allow for expansion of the shafts 55, and 53. The tubular shaft 55, has a drive gear 59, designed to be a common means for the connection and operation of an accessory assemblage. Four such connections are shown by the installation of lay shafts and gears. The gear 63, and its shaft 86, drives the oil pumps 62, and 87. The gear 89', connects the starter 89. And two synchronized magnetos 90, and 90a, are connected to the drive gear 59, to supply ignition for each of the group of engines, Figs. 9 and 12. Oil seals 52, 54, and 56, are placed at the front and rear of the case 49, and the shafts 55, and 53.

The cone 117, has an air intake 118, and an intake damper 119, which is regulated by cables 120, attached to the damper head 119a, carried by the bearing stem 119b, abutting the collar 119c. The cables 120, pass over pulleys through a guide 121', through a hollow in the shaft 5, over pulleys 122, and fasten to an operating lever 122', by which the amount of air admitted to the engine room 18, is regulated. See Fig. 1.

An air impeller located behind the cone 117, is composed of two members designed to rotate reversely in parallel planes adjacent, and a series of stationary helical blades 105, in the rear of the rotary members. A boss 103a, is affixed to the tubular shaft 55, by the hub 55a, and retaining bolts 55b. Impeller blades 103, are affixed to the boss 103a, and their outer ends to the encircling rim 103b, which is in streamlined contour with the cone 117, forming the front member of the impeller. It is also, the central structure to which the front propeller blades 123, are affixed. A boss 104a, is affixed to the tubular shaft 53, by a hub 53a, and retaining bolts 53b. Impeller blades 104, are affixed to the boss 104a, and at their outer ends to an encircling rim 104b, which is in streamlined contour with the rim 103b, and the fuselage 1, forming the rear member of the impeller. It is also, the central structure to which the rear propeller blades 124, are affixed, See Figs. 1 and 3.

The impeller forces air through the engine room 18, to cool and ventilate it and its contents. Deflectors 106, located at advantageous points in the engine room 18, guide currents of air against the engines to secure effective cooling and ventilation. A series of rearwardly inclined ventilating ports 107, (two of the series are shown in Fig. 1, and one in Fig. 6), are located in the outside wall of the engine room 18. The nozzle ends of these ports located in the slip stream generate a suction which assists in evacuation of the heated air from the engine room 18.

The rear member of the impeller is also used as the basis for the construction of a centrifugal blower and muffler to muffle the exhaust from the engines 23, and discharge it into the air stream 183. The boss 104a is formed with an annular recess and each of a selected number of the impeller blades 104 has constructed in it an exhaust conduit 111 rigidly attached at its inner end, and loosely attached (to allow for expansion) at its outer port 111a, through the rim 104b, Fig. 6. The blades 104, and the exhaust conduits 111, therein, incline away from the direction of travel. To prevent overheating, each conduit 111 is surrounded by an air space 11  Air intakes 114 admit air from the impeller to these air spaces and centrifugal force discharges it into the air stream 183 through the ports 114a, Figs. 6 and 7. Each exhaust pipe 28 passes from the collector 28', through the section 105b, into the annular recess. The discharge end is turned radially into the recess and toward the direction of travel of the blower 108. Scoop-like mouths 110a, going in the same direction as the exhaust fluid, take it up by centrifugal suction without noise or shock, and the conduits 111 discharge it by centrifugal force into the air stream 183 through the ports 111a, Fig. 6.

The front propeller helical blades 123, are fixedly attached to the outer rim 103b, of the front member of the impeller and rotate with it. The rear propeller helical blades 124, are fixedly attached to the outer rim 104b, of the rear member of the impeller and rotate with it. And since the impeller members rotate reversely in parallel planes adjacent, the propeller rotates likewise. Both series of rotary propeller blades 123 and 124, are surrounded by the inner section 4a, of the rear end 4'', flared rearward of the encasement 4. Each blade in the propeller is helical in form, with sharp acute edges and set at a pitch forming an angle between the forward face near the leading edge and the plane of rotation, greater than the effective helix angle. This construction is to avoid cavitation in a multibladed propeller and is illustrated diagrammatically in Fig. 18, in which 123, and 123', are two propeller blades, 123a, is the plane of rotation, 123b, is the line of the craft's advance, 123c, is the angle of the forward face of the blade, and 123d, is the effective helix angle. The line 123e, represents the path of the leading edge of the blade 123, and line 123f, the path of the blade 123'. The space 123g, between these lines represents the volume of air engaged by the blade 123', at normal density existing in the intake area. The sharp leading edge of the blade 123, cuts a wall of air as it advances without giving it a forward impulse. This allows the blade 123', to engage its full weight of air. Without a sharp leading edge and sufficient pitch, high blade velocity renders the propeller inefficient by cavitation, that is rarefaction of the air in the space 123g, between the blades.

The radial blades of the propeller members are set at a slant from the radii of the circle of rotation illustrated diagrammatically in Fig. 19, in which 123, is the trailing edge of a front propeller blade, and 124, is the leading edge of a rear propeller blade rotating reversely as shown by the arrows. This causes the edges of the blades 123, and 124, to shear past each other lessening shock and vibration. With a series of stationary helical blades at the rear of the rotary members and set at a slant the same effect will result. The same effect will also result as illustrated diagrammatically in Fig. 20, in which 123, is the trailing edge of a front propeller blade set to the true radii of the circle of rotation, 124 is the rear propeller blade set at a slant from the radii, of the circle of rotation and rotating reversely to 123, and 7 is the front edge of a stationary blade set the same as 123. The member 124, rotating between blades 123, and blades 7, shears past both.

An oil tank 61, is located near the end of the stationary shaft 5. An oil pump 62, with a clean oil division and a scavenger oil division is located on the section 49d, and is driven by the gear 63, upon the pump shaft 86. The gear 63, is in mesh with the driver gear 59. The oil pump shaft 86, extends rearward into the oil tank 61, where it operates an auxiliary oil pump 87, which will be always primed when the craft is in a vertical attitude. These pumps force oil into the transmission case 49, and throughout the mechanism needing lubrication, Figs. 1, 8, 9, 10, 11, 12 and 13.

An oil inlet pipe 88, admits oil from the tank 61, to the auxiliary pump 87. The oil then passes through the pipe 64, and oil screen 64', to the pump 62, which forces it under adequate pressure through pipe 66, to the cooling radiator 67, containing the cooling tubes 68, Figs. 8 and 10. It then passes through pipe 79, to the transmission case 49, through the distributing pipe 80, and through the nipples 81, connecting to the bore 81', in each of the engine shafts 29. Oil distributing disks 82, affixed to the shafts 29, and rotating therewith, receive oil through drill holes 82', and throw it upon the engine pinions 100, and the driven shaft gears 98, and 99. Oil is forced from the bore 81', to the engine crank bearings 29a, and the engine case 29b, also to the bearings open to the case 49, and through a drill in the rear oil seal 52, into the accessory section 49d. Air is drawn through the radiator tubes 68, by a suction fan 68', driven from the shaft 86. The used oil is returned from the sumps 85, through the pipe 83, to the scavenger pump division in the main oil pump 62, then through the pipes 65, the oil screen 65', into the oil tank 61. Float valves are inserted to prevent suction of air on account of the change of attitude of the craft.

The oil screens 64' and 65' are each composed of resilient sections forming two concentric cylinders of screening with the inner cylinder rigid. Excess dirt clogging the screening sections increases inside pressure and causes the resilient sections to spring out and open vents between the sections 70 and let the oil pass through.

A starting system is illustrated in Figs. 1, 8, 11, and 13 to 17. A starter 89, of any suitable type is located upon the accessory section 49d, with the gear 89', in mesh with the accessory drive gear 59, and rotates all of the pinions 100, in the normal direction. Each pinion 100, is mounted upon a sleeve hub 30, Fig. 13, which is journaled to the engine plate 50, by the bearing 101, and rotatively fitted to the engine drive shaft 29, against the annular shoulder 29', and held in place by the lock nuts 29". The sleeve hub 30, is enlarged beyond the shoulder 29', and has two one way locking pawls 32, and 32', located out of circumferential alignment, and fitted to supporting abutments 34, and 34', provided with springs 33, and 33', and held in place by retaining bolts 30', and 30", Figs. 13, 16, and 17.

The engine shaft 29, has two engaging notches 31, and 31', located in circumferential alignment with the pawls 32, and 32', respectively. This construction allows the pawl 32, to engage the notch 31, and the pawl 32', to engage the notch 31', on opposite sides of the shaft 29, and maintains invariable angular relation between the shaft 29, and the pinion 100. When the gears 98, and 99, are driving the pinion 100, and the sleeve 30, the pawls 32, and 32', disengage and allow the engines to idle.

Fig. 16 shows a clutch jaw on the end of the sleeve 30, with one way clutch teeth formed thereon, and Fig. 15 shows the face of a counterclutch jaw 36, with mating teeth thereon. The direction of sight in Figs. 15, and 16, is indicated by arrows on the peripheries of the jaws 35, and 36, in Fig. 13. The clutch jaw 35, has a smooth annular surface 30a, on its inner area which runs against the ends of the splines 37, upon the shaft 29, Fig. 14. The counterclutch jaw 36, has splines 37', fitted to the splines 37, upon the shaft 29, Fig. 14. The clutch teeth 35', and 35", upon the jaw 35, counter and engage the clutch teeth 36', and 36", upon the jaw 36. This construction allows an engagement at but one point in the angular rotation of the sleeve 30, and insures invariable angular relation between the shaft 29, and the pinion 100. This relation is essential to maintain ignition timing from a common source, for a group of engines, when the gears 98, and 99, are driving the engine, and when the engine has been started and becomes the driver of the pinion 100. It is the same in both instances.

The clutch jaw 36, has an annular recess 38, into which are fitted rollers 40 (one is shown and the other hid in Fig. 13). These are mounted upon opposite sides of the yoke 39. The yoke 39, is pivoted to a fulcrum bracket 41, and has an operating lever 42, with a disengaging spring 43, attached to it and to the engine case. An operating cable 44, is attached to the lever 42, guided around the pulley 45, and through ways 47, to a pull 48, upon the instrument board 163, Figs. 1, 8, and 13. The operation of starting a group of engines is as follows: When the craft is at rest and the engines dead, a pull 48, connected to any one of the engines in the group is manipulated to bring the clutch jaw 36, into engagement, then the starter is thrown into action and only the one engine is started. The starter is automatically disengaged and the engine started becomes the power to start the other engines by manipulating the pulls 48, connected to their respective engines. In this way starter energy is only used to start one engine of the group. When an engine has been started the torsional moment upon its shaft 29, is reversed in axial direction. This reversal of torsional moment releases the clutch jaw 36, and the spring 43, disengages it and holds it disengaged which avoids any danger of a dead engine, during flight, being a brake upon the other engines. It also leaves the group of engines ready to be started again.

Arms 172, are attached by hinges 173, to the outside of the front end of the annular section 4b, of the encasement 4, with one close to each side of each of the standards 2. Pairs of these next to the standards diverge radially sufficient to allow a sail attached thereto to fit over the tapered ends of the standards when the arms are collapsed. Springs 174, are operatively placed under a selected number of the arms 172, near their hinged ends. A landing sail 171 is attached to the under side of the arms 172. An operating cable 175, is attached to the free end of each of the arms 172, and passed over a series of pulleys 176, and attached to an operating winch 177. The winch has a wheel 178, a ratchet 179, and a pawl 180, to operate, lock and release it. The arms 172, and sail 171, are collapsed in their normal position into the circumferential recess 171', during flight, except the portion stretched over the tapering ends of the standards 2. When a landing is to be made the pawl 180, is disengaged, whereupon the springs 174, throw the selected arms of the series 172, out, causing the relative air movement upward to extend the arms 172, and sail 171, to any predetermined limit as illustrated by dotted lines 171a, Fig. 1. The angle of extension may be varied within the limit 171a, and the arms and sail collapsed and held by winding in the cables 175 upon the winch 177, and locking it.

An engine is defined to be any number of engine cylinders and operative means for applying prime moving energy to a single crank drive shaft. It is common practice as a factor of safety in aircraft construction to use a plurality of spark plugs in each combustion chamber of internal combustion engines, and to provide electrical ignition current from independent plural sources with the timing of ignition from the plural sources synchronized. The principles involved herein are equally applicable to single or treble ignition.

These results are obtained in a group of engines working in unison, by providing a source of electrical energy and its distribution from a drive gear 59, Figs. 8 and 11, common to the plural ignition mechanisms serving the group of engines. A generator and battery system may be used, but a preferred construction is illustrated as two synchronized magnetos 90, and 90a, with electrical conductors 92, and 92a, Figs. 1, and 11. The magneto 90, is connected in parallel by the conductor 92, to a spark plug 23' (two of a series are shown, engines 23a, and 23c, Fig. 1), in each combustion chamber in the group of engines, and magneto 90a, is likewise connected by the conductor 92a, to a second spark plug (not shown), in each of the same combustion chambers. The electrical connection for ignition to all the combustion chambers is similar. A group may consist of any plural number of engines (four are shown in Figs. 3, 9, and 10, and six diagrammatically in Fig. 21), within the limits of the engine room 18, and the limits imposed by the ratio of rotation between the gears 100, and the gears 98, and 99, Figs. 3, and 9.

The construction of a common source of electric current, a distributor of current and timed electric contacts electrically connected to spark plugs in selected subdivisions of the cylinders comprised in a group of engines provides that ignition can be controlled by well known timing means to give ignition in even successive intervals of time, first, in single explosions in each of a group of engines, and second, in synchronized multiple explosions in selected engines of the group. In the first plan, suppose a group (not shown), of three radial four cycle engines of seven cylinders each to be installed in the engine room 18, radial to the gears 98, and 99, with engine pinions like 100, in mesh with the gears. Then the order of ignition would be as follows: The first cylinders in the three engines are ignited at even successive intervals; then the third cylinders in the three engines are ignited at even successive intervals, and so on until the twenty one cylinders have been fired, giving twenty one power impulses at even intervals of time. An example of the second plan is illustrated in Figs. 1, and 3, showing a group of four radial four cycle engines, 23a, 23b, 23c, and 23d, of seven cylinders each. The twenty eight cylinders comprised in the group of four engines, are divided into fourteen selected subdivisions of two cylinders each, for ignition purposes, by selecting and synchronizing one cylinder from each of the engines 23a, and 23c, for each of seven subdivisions, and one cylinder from each of the engines 23b, and 23d, for each of seven subdivisions. The subdivisions in engines 23a, and 23c, are ignited alternately with the subdivisions in the engines 23b, and 23d, at even intervals of time, giving fourteen power impulses in firing the twenty eight cylinders once around.

The diagram, Fig. 21, represents a group of six radial four cycle engines of nine cylinders each (the number of cylinders not shown), adapted to the engine room 18, Fig. 1. In the diagram suppose the fifty four cylinders comprised in the group of six engines are divided into eighteen selected subdivisions of three cylinders each, for ignition purposes, by selecting and synchronizing one cylinder from each of the engines 23e, 23g, and 23i, for each of nine subdivisions, and one cylinder from each of the engines, 23f, 23h, and 23j, for each of nine subdivisions. The subdivisions in the engines 23e, 23g, and 23i, are ignited alternately with the subdivisions in the engines 23f, 23h, and 23j, at even intervals of time, giving eighteen power impulses in firing the fifty four cylinders once around.

The above stated examples illustrate the fundamental plan of igniting the cylinder charges in a group of engines to give single or synchronized multiple explosions at even intervals of time, producing a smooth continuous power delivery to the propeller of an aircraft. Any number of cylinders, in any number of engines workable and of any type may be divided into various subdivisions and ignited in single or synchronized multiple explosions from a common source of timed electrical ignition. In synchronized multiple explosions it is preferable to select and synchronize engines located equidistant from each other around the gears 98, and 99, to balance the torsional moments on these gears.

After the cylinders in any group of engines have been fired once around the operation is continued at will.

Means to control the roll of the craft upon its longitudinal axis comprise a plurality of rudders 155 each having an axle 156, Figs. 3, 4 and 5. Fig. 5 shows one form. Each axle 156 is pivoted to an arm 157 and is journaled in a bearing 157a in the wall of the fuselage 1. The axle 156 extends into the engine room 18 and has a crank 158 affixed to it, Fig. 4. An operating cable 159 is attached to the cranks 158, guided over the pulleys 160 and 161, and affixed to a control segment 162, which is operated by the stick 162', Fig. 1. The segment axle 162a, has a duplicate segment 162b mounted upon it loosely and close against the segment 162. The duplicate segment 162b is connected in the usual way to the ailerons 10. A lock bolt 162c, operated by a foot lever, when slipped rearward binds the two segments together by an aft spur through mortises in both segments so the stick 162' operates conjointly both the ailerons 10 and the rudders 155. By slipping the lock bolt 162c forward, the segment 162b is released from the segment 162 and locked by a front spur on the lock bolt 162c to the frame 162e, and holds the ailerons 10 in a neutral position. The roll of the craft is then controlled solely by the rudders 155. This is incidentally useful in backing the craft down for landing because the relative upward current of air against the ailerons 10 counters the rudders 155, which operate in the downward current of the slipstream from the propeller. The rudders 155 also serve to guide the craft in its transportation while landed.

Seats are provided for the operator and passengers as illustrated in Fig. 1. The operator's seat 164, swings between two standards 165, from the pivots 166. It may be adjusted to move to any predetermined angle required for operating any given craft in the attitudes it is to assume in ascension, flight and landing. Other seats 167, are fastened by pivots 169, to frames attached to the wall of the fuselage 1. Each frame has a rack 169', with latch notches 169". Each seat 167, has a latch 167', with a tapered end adjusted to fit into the notches 169", to prevent annoying oscillations. When the craft is changing from a vertical to a horizontal attitude and when changing in the reverse, the weight of the occupant of the seat 167, forces the tapered end of the latch bolt 167', out of the notch 169", and allows the seat 167, to swing to a normal position as indicated by dotted lines, Fig. 1. An emergency knob 167", enables the occupant of the seat 167, to release the seat at will. Foot rests 170, make a safe and comfortable support for the feet of the occupants of the seats. Only the frames of the seats are shown. These may be upholstered suitably for the type and purpose of any given craft.

Instruments of navigation and indicators for the various operations of the craft and its mechanism are provided, to be connected according to engineering practice.

The accessories shown upon the section 49d, do not limit the location and operation of other accessories not shown. The drive gear 59, is designed to be the master source of power, and the section 49d, the principal location for accessory assembly and operation. A central accessory assembly common to all the engines in the power plant, saves space in the engine room 18, and economizes the cost of producing and installing these necessary adjuncts to the power plant. It locates the accessories near the doors 20, and renders access convenient.

Means for the storage of fuel, carburization, charging the engines, compressing air therefor and for the sustenance of life in high altitudes may all be accomplished according to methods and practices known to the art.

A door 14, to the load room 15, and a registering door (not shown), in the incircling shell 3, provides entrance to the craft. A bulkhead 13, placed across the fuselage 1, serves as a floor when the craft is in a vertical attitude. It cuts off a storage hold in the rear of the fuselage 1. This hold is accessible by a door 13'. A floor 17, serves when the craft is in a horizontal attitude. It has mortise footholds (not shown), for ascension to the pilot's seat and to the engine room when the craft is in a vertical attitude.

The control stick 162', Fig. 1, conforms to the well known construction and practice for the control of the ailerons 10, and elevators 12, with the added modifications herein specified regarding the control of the rudders 155. The foot bar and cable connections (not shown), for the control of the rear rudder 11, are to be installed according to the common practice in the art.

An air passageway 183", with a primary intake 183, and an auxiliary intake 183', extends from the front to the rear of the craft between the fuselage 1, and the incircling shell 3, and 3', and is divided into segments by the standards 2.

The wings 9, are made and attached to the craft in accord with the principles of construction and practice in the art.

Transparent sections (not shown), in the fuselage 1, and the incircling shell 3, furnish light and visibility. Periscopes, altiscopes and panoramic sights may be installed for visibility.

The common landing gear (not shown), for horizontal launching and landing, when desirable, may be constructed and applied by known means in the art.

In preparing for launching vertically into the air, the craft is conveyed upon its landing wheels 132, to a favorable location. It is then turned by the roll rudders 155, to face the direction best suited for the ascension as may be determined by the operator's skill in the art. The impeller-propeller is speeded up until it lifts most of the weight of the load. The landing wheels 132, and their equipment are each retracted into its allotted recess 8, and held, by winding in the cables 147, upon the winch 146, and locking it. The doors 154, are now closed and fastened by the latches 154a. The craft is now supported upon the standards 2. In this position the incircling shell 3', fits close to the ground. The power is applied and the propeller compresses air within the shell 3, and 3', around and under the fuselage 1, until this pressure in cooperation with the aerodynamic lift of the propeller causes the craft to arise.

When a sufficient height has been attained, the craft is turned to a horizontal attitude in the usual way as in looping the loop, and flight continued and maneuvered by the means of propulsion, sustentation and control.

To make a landing, the craft is turned to a vertical attitude, as in Fig. 1, by operating the empennage rudders 12. The landing sail 171, is released and extended. The craft is now sustained by the landing sail in co-operation with the aerodynamic lift of the propeller. These two sustaining elements puts the center of lift far above the center of weight giving effective stabilization.

The ailerons 10, are locked in a neutral position because they are ineffective during the backward movement of the craft in landing. To lessen wind drift the aerofoil 9, is brought into linear alignment with the wind direction shown upon the instrument board 163. This is done by operating the roll control rudders 155, at the rear of the helical blades 7. In doing this the landing equipment, also, is turned so that two opposite wheels 132, are in alignment with the wind direction giving the widest possible base to stabilize the craft when the landing contact is made. To further counteract drift, the craft is inclined into the wind, the degree of its inclination being shown by an inclinometer upon the instrument board. This inclination of the longitudinal axis, also, tips the landing sail 171, an equal angle from horizontal and causes it to glide the craft in co-operation with the pull of the propeller against wind drift. When nearing the earth the pilot can judge the distance yet to descend, and as to a favorable landing location by the use of instruments of visibility. As the craft descends it can be driven laterally to seek an exact landing point. If it needs to go with the wind or any angle to the wind direction, the aerofoil 9, is turned transverse to the wind and its angle thereto varied by the use of the roll control rudders 155, at the rear of the helical blades 7. If it needs to go directly into the wind the aerofoil is kept in alignment with the wind and the craft moved laterally by inclining its axis.

When the craft is over desirable landing ground, all lateral movement must be approximately counteracted. When landing contact is imminent, the landing wheels 132, are released and automatically extended and locked from retraction. The craft is now straightened up to an approximately vertical attitude to cause all the caster landing wheels 132, to contact evenly and simultaneously. The landing sail is set to its most effective angle. The speed of the impeller-propeller, indicated by the tachometer on the instrument board, is regulated in co-operation with the landing sail to ease the craft down to a cushioned landing. The landing caster wheels 132, being free to move in any lateral direction prevents overturning the craft from any slight lateral movement when the landing contact is made. After the craft has been landed, it is controlled by the co-operation of the power and impeller-propeller assembly, the roll control rudders 155, the empennage rudders 11, and 12, and the landing caster wheels 132, to perform the usual limited travel upon the ground required in aerial transportation. The craft rests upon the wheels 132, sustaining it clear from the ground. By operating the power and impeller-propeller assembly, its aerodynamic lift sustains a portion of the craft's weight in proportion to the speed of the impeller-propeller. This lift facilitates the movements of the craft upon the caster wheels 132. By operating the roll control rudders 155, at the rear of the helical blades 7, the craft is turned to face in any way desired, and by flexing the empennage rudder 11, and 12, by the usual means, it is driven laterally in any direction with the landing wheels 132, sustaining part of the weight and giving the craft stability in an upright attitude.

The operation of a horizontal launching and landing craft is accomplished by the usual methods in the art.

Having described my invention, I claim:

1. In an aircraft, a propulsive system composed of three sets of helical blades with the blades in each set disposed at a different radial slant from the other two sets.

2. The combination of a single driven shaft, a plurality of motors adapted to be connected to said shaft, ignition means for said motors, an ignition timing device common to all the motors and driven by said shaft, each of said motors having means for connecting it to said shaft, said means being connectible in only one rotative position of the motor relative to the shaft.

3. The combination of a single driven shaft, a plurality of motors adapted to be connected to said shaft, ignition means for said motors, an ignition timing device common to all the motors and driven by said shaft, and a plurality of clutches, one for each motor, for connecting the motors to said shaft, each of said clutches being operable to connect its motor to the shaft in only one position with relation to each other whereby the ignition timing device will operate in proper timed relation for the respective motors.

4. The combination of a single driven shaft, a plurality of motors adapted to be connected to said shaft, a starter for driving said shaft, each of said motors having means for connecting it with the shaft in only one rotative position of the motor relative to the shaft whereby the motors may be driven by the shaft, ignition means for said motors, an ignition timing device common to all the motors and driven by said shaft, and a second means for each of the motors for connecting its motor to the shaft, said second means being connectible in only one rotative position of the motor relative to the shaft.

5. The combination of a single driven shaft, a plurality of motors adapted to be connected to said shaft, a pair of clutches for each motor for connecting it with the shaft, each of said clutches being connectible in only one rotative position of the shaft relative to the motor, a starter for driving the shaft, and an ignition timing device driven by the shaft, one clutch being operable only in one direction to permit the starter to drive the motor and being releasable when the motor is started, the other clutch being operable only in the opposite direction to permit the motor to drive the shaft.

DAVID E. VAN VACTOR.